United States Patent
Beard

(10) Patent No.: US 7,155,196 B1
(45) Date of Patent: Dec. 26, 2006

(54) INTERMEDIATE FREQUENCY TUNER

(75) Inventor: Paul Beard, Milpitas, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 342 days.

(21) Appl. No.: 10/150,677

(22) Filed: May 17, 2002

Related U.S. Application Data

(60) Provisional application No. 60/291,785, filed on May 17, 2001.

(51) Int. Cl.
  *H04B 1/16* (2006.01)
(52) U.S. Cl. .................... 455/339; 455/334; 455/296; 455/317; 455/226.1; 455/226.2
(58) Field of Classification Search ............ 455/339, 455/334, 296, 317, 307, 226.1, 226.2, 226.3, 455/63.1, 67.11, 67.13, 266, 340
See application file for complete search history.

(56) References Cited

U.S. PATENT DOCUMENTS

| | | | | |
|---|---|---|---|---|
| 4,408,322 A | * | 10/1983 | Chadwick et al. | 370/252 |
| 5,175,880 A | * | 12/1992 | Brown | 455/226.1 |
| 5,325,204 A | * | 6/1994 | Scarpa | 348/607 |
| 5,475,871 A | * | 12/1995 | Shalev et al. | 455/70 |
| 5,487,186 A | * | 1/1996 | Scarpa | 455/192.2 |
| 6,219,376 B1 | * | 4/2001 | Zhodzishsky et al. | 375/148 |
| 6,324,390 B1 | * | 11/2001 | Elder et al. | 455/333 |
| 6,532,358 B1 | * | 3/2003 | Earls et al. | 455/234.1 |
| 6,836,105 B1 | * | 12/2004 | Zou | 324/95 |

* cited by examiner

*Primary Examiner*—Matthew Anderson
*Assistant Examiner*—Minh Dao
(74) *Attorney, Agent, or Firm*—Marger Johnson & McCollom PC

(57) ABSTRACT

The present invention is a method and apparatus for optimizing performance of a transceiver selecting and processing an intermediate frequency free of significant interference, such as noise. A frequency band may be scanned to detect interference upon which an intermediate frequency free of significant interference may be selected. This may enhance performance of the receiver by reducing the effects of noise. Additionally, perrformance may be further optimized by adjusting the passband of the filter such that the center of the passband matches the selected intermediate frequency. This may provide stability as centering of the passband may account for process, voltage and temperature variations and errors. Further, performance may be enhanced by ensuring desirable signal attributes are passed through the filter.

20 Claims, 4 Drawing Sheets

INTERMEDIATE FREQUENCY TUNER

CROSS REFERENCE TO RELATED APPLICATIONS

The present application claims the benefit under 35 U.S.C. § 119 of U.S. Provisional Application Ser. No. 60/291,785 filed on May 17, 2001. Said U.S. Provisional Application Ser. No. 60/291,785 is hereby incorporated by reference.

FIELD OF THE INVENTION

The present invention generally relates to transceivers, and more particularly to a method and apparatus for improving transceiver performance by selecting an optimal intermediate frequency signal of a radiated signal in real-time.

BACKGROUND OF THE INVENTION

Conventional radio receivers typically incorporate an intermediate frequency (IF) strip. An IF strip allows filtering and amplification to be performed at a lower frequency and cost than the radiating frequency. Further, an IF strip is capable of being set at a frequency above where 1/f noise, direct current, and IP2 offset issues are troublesome.

Intermediate frequency filters known to the art include single frequency filters and tunable filters. A single frequency tuner provides stability and selectivity, however, receiver performance is limited due to a fixed frequency range. Tunable filters provide flexibility but are subject to stability problems and low performance. Additionally, while tunable filters may be operable in some radio-frequency environments, tunable filters do not operate well in a frequency hopping environment. Consequently, a method and apparatus for processing an intermediate frequency signal of a radiated signal that provides enhanced stability and performance while allowing flexibility is necessary.

SUMMARY OF THE INVENTION

Accordingly, the present invention is directed to a method and apparatus for selecting and processing an intermediate frequency that may optimize performance of a transceiver. A filter in accordance with the present invention may be capable of processing a range of frequencies. Performance may be optimized by adjusting the passband of the filter such that the center of the passband matches the selected intermediate frequency.

In a first aspect of the invention, an intermediate frequency free of significant interference may be selected. In one embodiment of the invention, a local oscillator (LO) of a transceiver may be swept and interference may be measured within a range of an intermediate frequency strip. An intermediate frequency free of significant interference may be selected on an instantaneous basis. Utilization of an intermediate frequency free of significant interference may be advantageous as it may provide for optimal transceiver performance.

In a second aspect of the invention, upon the selection of an optimal intermediate frequency, the passband of a filter of the present invention may be immediately swept to center the passband of the filter on the selected intermediate frequency. This may provide stability as centering of the passband may account for process, voltage and temperature variations and errors. Further, performance may be enhanced by ensuring desirable signal attributes are passed through the filter.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
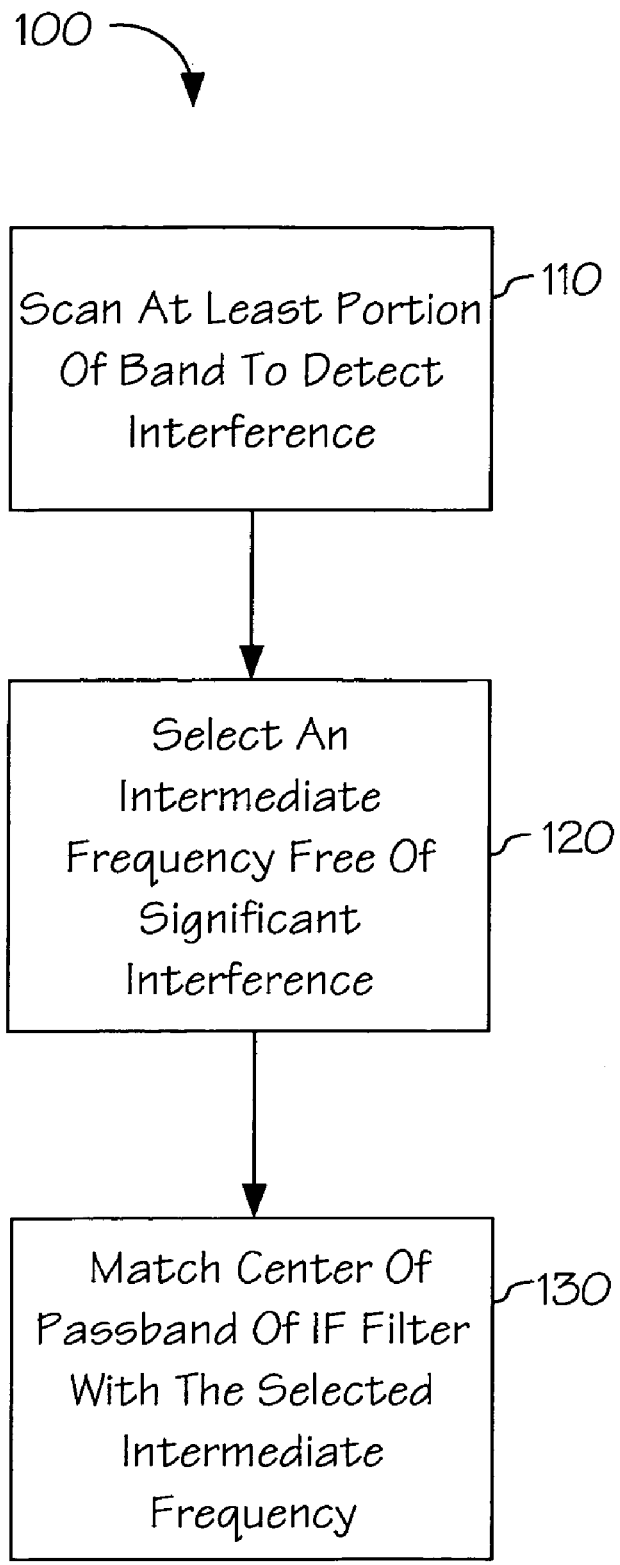
FIG. 1 depicts an embodiment of a process for optimizing transceiver performance in accordance with the present invention.

Referring to FIG. 1, an embodiment of a process 100 for optimizing transceiver performance in accordance with the present invention is shown. Process 100 may be performed by a transceiver to process an intermediate frequency portion of a received signal. Process 100 may begin as a transceiver may scan at least a portion of a frequency band to detect interference 110. A portion of the frequency band may be equivalent to an intermediate frequency strip. In one embodiment of the invention, process 100 may be scanning for the presence of a characteristic, such as a change in amplitude, frequency or period of a signal. A characteristic may include noise or other type of interference which may prevent optimal demodulation of a modulated signal. Upon a scan of at least a portion of the frequency band, an intermediate frequency is selected that may be free of significant interference 120. In accordance with the present invention, transceiver performance may be improved by utilizing an intermediate frequency that does not include interference such as noise preventing optimal demodulation of the desired signal.

Process 100 may continue by matching the center of a passband of an intermediate frequency filter with the selected intermediate frequency 230. Matching the center of a passband of an intermediate frequency filter with the selected frequency may be advantageous as it may provide further improved performance for a transceiver implementing process 100 of the present invention. This may provide stability as centering of the passband may account for process, voltage and temperature variations and errors. Further, performance may be enhanced by ensuring desirable signal attributes are passed through the filter.

Figure 2:
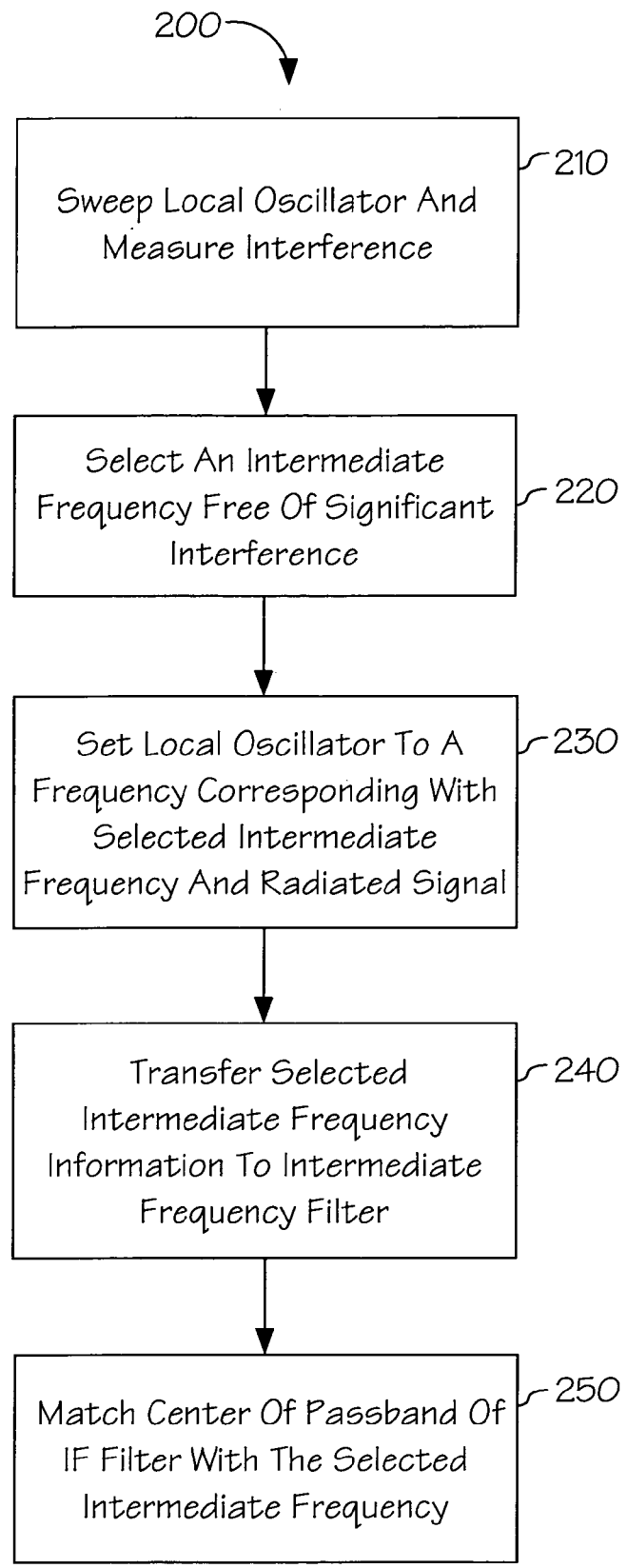
FIG. 2 depicts an embodiment of a process of implementing the process 100 of FIG. 1 in accordance with the present invention.

Referring now to FIG. 2, an embodiment of a process of implementing the process 100 of FIG. 1 in accordance with the present invention is shown. Process 200 may begin by sweeping a local oscillator (LO) and measuring interference of the swept frequency band. In one embodiment of the invention, measurement of interference may be accomplished with a received signal strength indicator (RSSI). The received signal strength indicator may detect the received signal strength of the swept frequencies. A frequency with a low received signal strength indication may be selected as the intermediate frequency as this particular frequency may be free of significant interference 220. It should be understood by those with ordinary skill in the art that other mechanisms for determining a frequency free of significant interference may be employed in accordance with the present invention without departing from the scope and spirit of the present invention.

Upon a selection of a desired intermediate frequency, a local oscillator may be set to a frequency corresponding with the selected intermediate frequency and the radiated signal 230. For example, the local oscillator may be set at a value corresponding to the sum of the frequency value of the selected intermediate frequency and the radiated frequency. Additionally, the selected intermediate frequency information may be transferred to an intermediate frequency filter of the present invention 240. The center of the passband of the IF filter may be matched with the selected intermediate frequency 250.

An advantageous aspect of the present invention is the ability to perform process 200 in a continuous fashion. Thus, in one embodiment of the invention, the process of selecting an intermediate frequency free of significant interference may be performed in real-time. As a result, the selected intermediate frequency may account for random noise and random process variations that may occur as a product is operated in different environments and operated according to different conditions.

Figure 3:
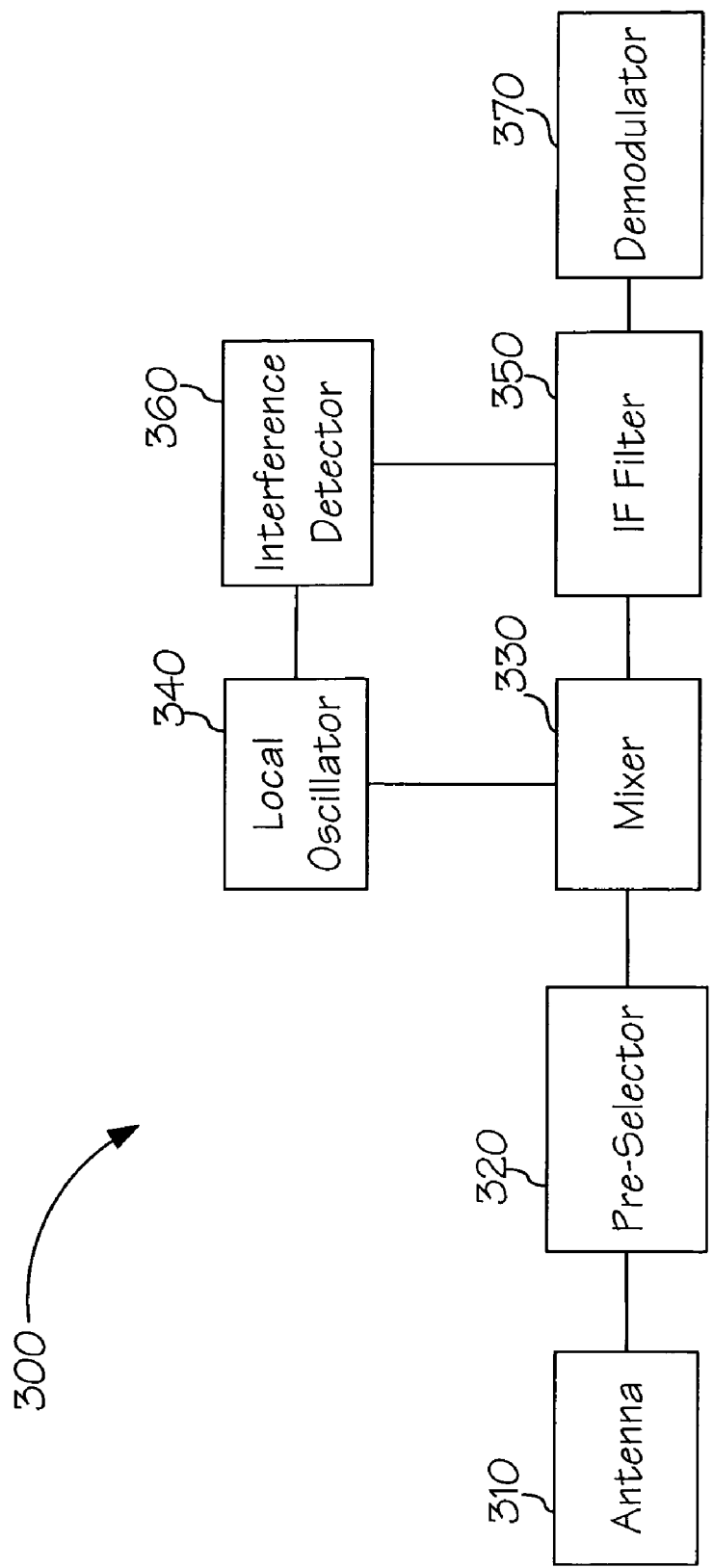
FIG. 3 depicts an embodiment of a transceiver for implementing processes 100 and 200 of the present invention.

Referring now to FIG. 3, an embodiment of a transceiver 300 for implementing processes 100 and 200 of the present invention is shown. In an embodiment of the invention, transceiver 300 may operate in the 2.4 GHz Industrial, Scientific and Medical (ISM) band. Additionally, transceiver 300 may operate according to the BLUETOOTH specification and may be packaged on a single chip. Transceiver 300 may include an antenna 310 and a pre-selector 320 to aid in the reception of signals. Pre-selector 320 may include a frequency amplifier and/or filter circuit. Pre-selector 320 may amplify the desired radiated signal and reduce some of the off-frequency noise caused by other radiated frequencies. The received signal may be sent through a mixer 330. A local oscillator 340 may supply an oscillator frequency to mixer 330 in which an intermediate frequency is produced. In an embodiment of the present invention, local oscillator 340 is swept and inteference is measured by interference detector 360.

Interference detector 360 may measure the interference to allow a selection of an intermediate frequency free of significant interference. Interference detector 360 may be capable of detecting a characteristic, such as a change in amplitude, frequency, period, and the like. In one embodiment of the invention, the characteristic may be a change in noise. Noise may refer to unwanted disturbances imposed upon a spread spectrum signal. In one embodiment of the invention, interference detector 360 may be a received signal strength indicator (RSSI). The received signal strength indicator may detect the received signal strength of the swept frequencies. A frequency with a low received signal strength indication may be selected as the intermediate frequency as this particular frequency may be free of significant interference. It should be understood by those with ordinary skill in the art that other mechanisms for determining a frequency free of significant interference may be employed in accordance with the present invention without departing from the scope and spirit of the present invention.

IF filter 350 of the present invention may receive the selected intermediate frequency information from the interference detector 360 of the present invention. In an embodiment of the invention, IF filter 350 of the present invention may be adjustable. For example, IF filter 350 of the present invention may match the center of its passband with the selected intermediate frequency. Demodulator 370 may receive the modulated intermediate frequency carrier. In an embodiment of the invention, demodulator 370 may separate the radiated frequency from the intermediate frequency carrier.

Figure 4:
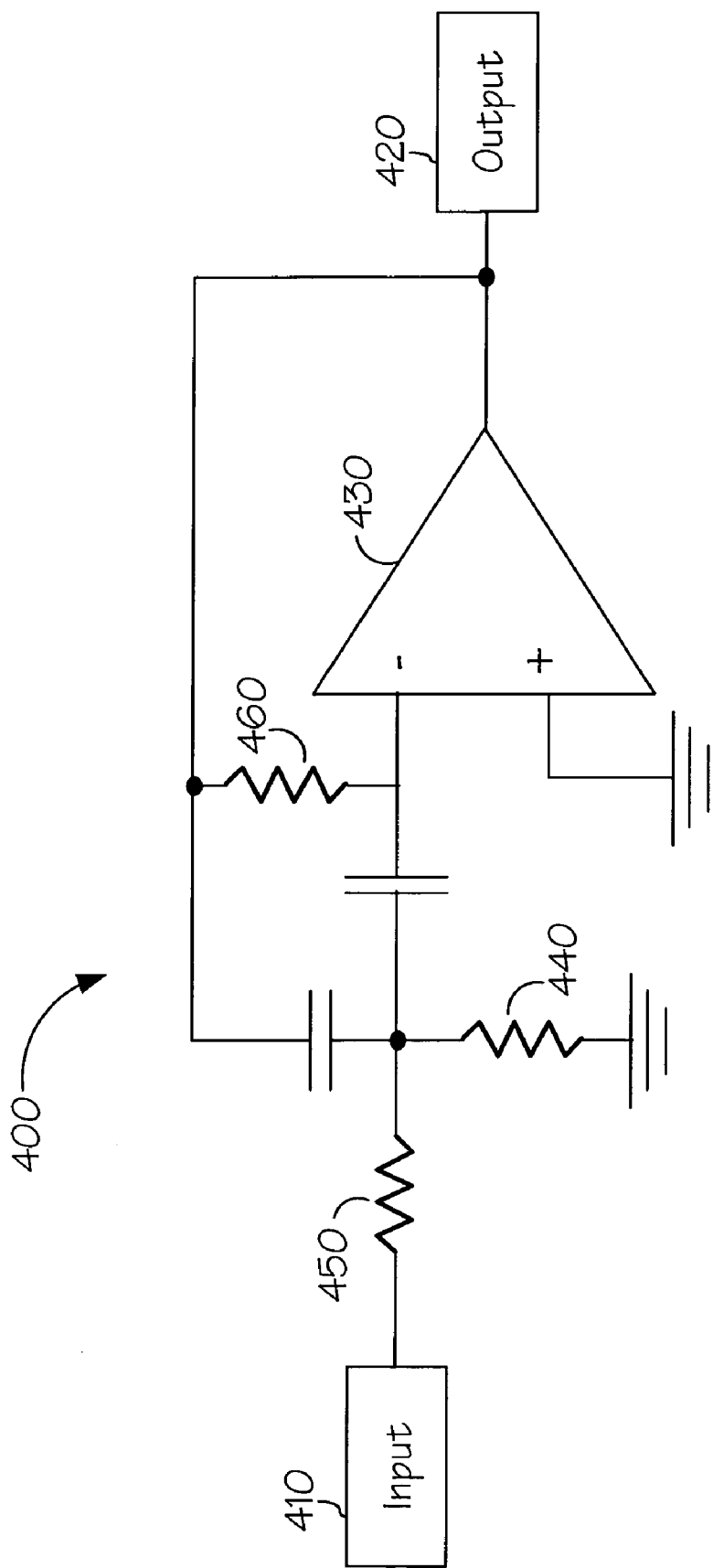
FIG. 4 depicts an embodiment of a programmable filter of the present invention.

Referring to FIG. 4, an embodiment of a programmable filter 400 of the present invention is shown. In an embodiment of the invention, programmable filter 400 may be representative of IF filter 350 of FIG. 3. Programmable filter may receive an input signal 410 and produce an output signal 420 which has been isolated and amplified. It should be understood by those with ordinary skill in the art that the input signal of FIG. 3 may be the intermediate frequency carrier. Programmable filter 400 may further reduce off-frequency noise while amplifying the intermediate frequency carrier.

In an embodiment of the invention, programmable filter 400 may include resistors 440–460, capacitors, and an operational amplifier 430. An advantageous aspect of programmable filter 400 of the present invention is the ability to tune itself to the selected intermediate frequency as described in FIGS. 1–3. Adjustment of the center frequency in an embodiment of the invention may be controlled by adjusting the resistance of resistor 440. For example, resistor 440 may be a digitally controlled potentiometer. A signal relating to the selected intermediate frequency may be transferred to the potentiometer. This signal may control the adjust of the resistance of resistor 440 to control the center frequency of the filter. As a result, the center of the passband may be adjusted to the selected intermediate frequency. Additionally, the bandwidth of the passband may be adjustable. The resistance value of resistors 450, 460 may be adjusted to vary the bandwidth of the passband of the filter. It should be understood by those with ordinary skill in the art that other types of configurations of adjustable filters may be utilized in accordance with the present invention to match the center of the passband with a selected intermediate frequency without departing from the scope and spirit of the present invention.

It is believed that the system and method and system of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for processing an intermediate frequency signal of a transceiver, the method comprising:

scanning an intermediate frequency band to measure an interference in the intermediate frequency band;

selecting an intermediate frequency from the intermediate frequency band, the intermediate frequency selected based upon a measured interference level at the intermediate frequency being below a threshold level; and matching a center of a passband of a filter with the intermediate frequency, wherein an output of the filter is demodulated to separate a received signal from a carrier of the intermediate frequency.

2. The method as claimed in claim 1, wherein the intermediate frequency band is equivalent to an intermediate frequency strip.

3. The method as claimed in claim 1, wherein the interference is a change in at least one of amplitude, frequency, and period.

4. The method as claimed in claim 1, wherein the interference is measured by monitoring a received signal strength indication.

5. The method as claimed in claim 4, wherein scanning the intermediate frequency band comprises sweeping a local oscillator of the transceiver.

6. A transceiver comprising:
   an oscillator, the oscillator configured to produce an oscillator signal having an output frequency;
   a mixer coupled to the oscillator and configured to accept a received signal and the oscillator signal, the mixer configured to utilize the oscillator signal to produce a carrier for the received signal, the carrier having an intermediate frequency;
   an adjustable filter coupled to the mixer, the adjustable filter configured to match a center of a passband of the adjustable filter to a desired intermediate frequency; and
   an interference detector coupled to the oscillator and the adjustable filter, the interference detector configured to measure an interference level associated with the oscillator signal, wherein the desired intermediate frequency is selected based upon the interference level being below a threshold level.

7. The transceiver as claimed in claim 6, wherein the oscillator is configured to sweep through a portion of a frequency band.

8. The transceiver as claimed in claim 6, wherein the output frequency is set at a frequency corresponding to the desired intermediate frequency and the received signal.

9. The transceiver as claimed in claim 6, wherein the interference detector includes a received signal strength indicator.

10. The transceiver as claimed in claim 6, wherein the interference comprises a change in at least one of amplitude, frequency, and period.

11. An apparatus for processing an intermediate frequency, the apparatus comprising:
    means for scanning an intermediate frequency band to measure an interference in the intermediate frequency band; and
    means for selecting an intermediate frequency from the intermediate frequency band based upon a measured interference in the intermediate frequency being less than a threshold level, the selecting means coupled to the scanning means, wherein the intermediate frequency is demodulated to separate a received signal from a carrier of the intermediate frequency.

12. The apparatus as claimed in claim 11, further comprising means for matching a center of a passband of a filter with the intermediate frequency, the matching means coupled to the selecting means.

13. The apparatus as claimed in claim 11, wherein the intermediate frequency band is equivalent to an intermediate frequency strip.

14. The apparatus as claimed in claim 11, wherein the interference comprises a change in at least one of amplitude, frequency, and period.

15. The apparatus as claimed in claim 11, wherein the interference is measured by monitoring a received signal strength indication.

16. A method of processing an intermediate frequency, the method comprising:
    sweeping an oscillator of a transceiver across an intermediate frequency band;
    measuring an interference present in the intermediate frequency band;
    selecting an intermediate frequency from the intermediate frequency band, the intermediate frequency selected based upon a measured interference at the intermediate frequency being less than a threshold level; and
    matching a center of a passband of a filter to the intermediate frequency, wherein an output of the filter is demodulated to separate a received signal from a carrier of the intermediate frequency.

17. The method as claimed in claim 16, wherein the frequency band is equivalent to an intermediate frequency strip.

18. The method as claimed in claim 16, wherein the interference comprises a change in at least one of amplitude, frequency, and period.

19. The method as claimed in claim 16, wherein the interference is measured by monitoring a received signal strength indication.

20. The method as claimed in claim 16, wherein selecting the intermediate frequency occurs in real-time concurrently with the measuring of the interference.

* * * * *